Sept. 10, 1935.   S. N. HURT   2,013,961
WEIGHING SCALE
Filed March 4, 1932
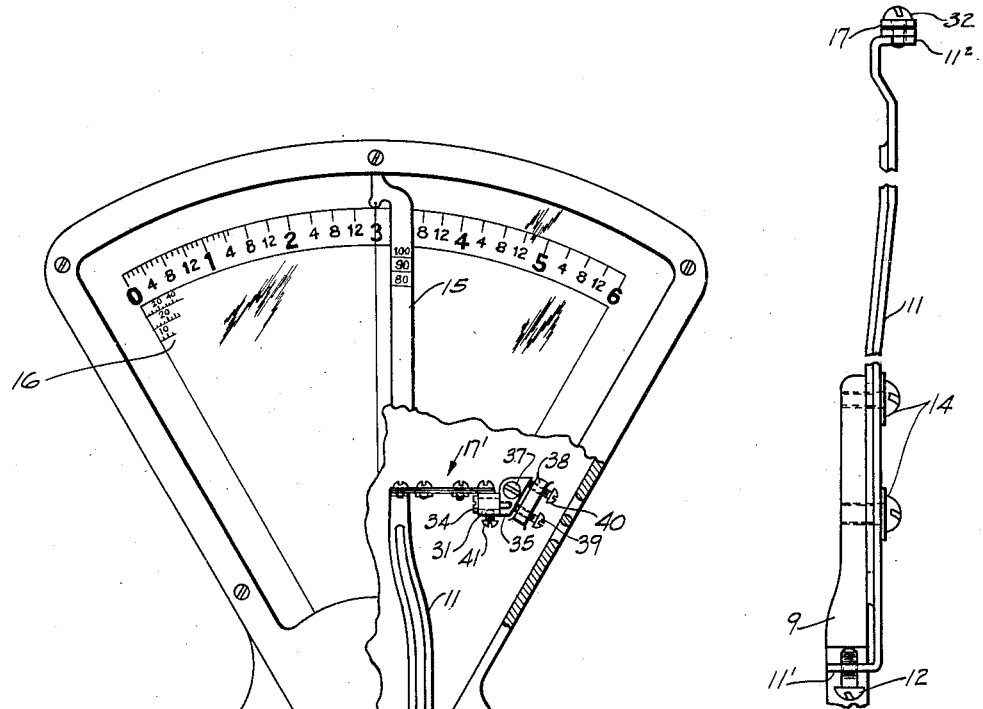
Fig. I
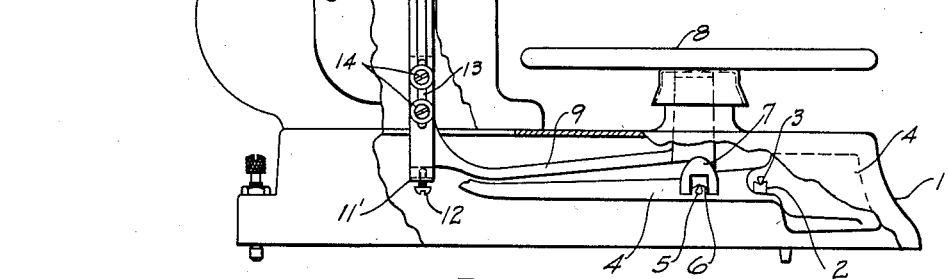
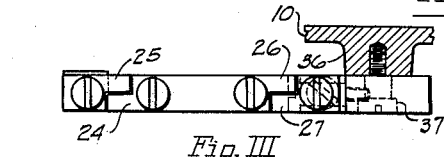
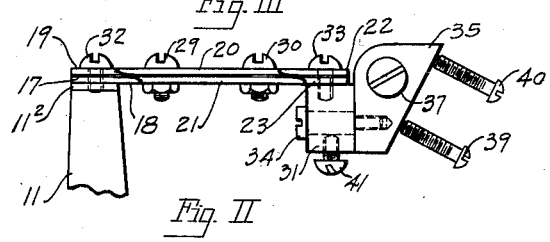
Samuel N. Hurt
INVENTOR
BY *Marshall*
ATTORNEY Patented Sept. 10, 1935

2,013,961

UNITED STATES PATENT OFFICE 2,013,961

WEIGHING SCALE

Samuel N. Hurt, Toledo, Ohio, assignor to Toledo Scale Manufacturing Company, Toledo, Ohio, a corporation of New Jersey Application March 4, 1932, Serial No. 596,804

2 Claims. (Cl. 265—27)

This invention relates to improvements in weighing scales and particularly to improvements in check stays which find manifold applications in such scales. Stays of this type are used to parallelly guide scale members, to maintain the condition of level of the load receiver or to maintain the vertical position of a drive member such as a rack or other parts. Check stays are also used to maintain the pivots of levers in direct relation with other members as has been suggested in United States Patent No. 1,549,977 to Halvor O. Hem. Regardless, however, for what purpose the stay is used, its construction must insure absence of lost motion, the indestructibility of a force parallelogram, and the parallel alignment of the stay itself to a plane. This is particularly true when the stay has so-called flexure plate joints. Such check stays are generally made from a piece of steel capable of being hardened and tempered and having portions transverse to the longitudinal axis reduced in thickness to insure flexing only at those points. However, stays of this type are also known which employ a thin, flexible steel or other metallic ribbon and reinforcing the ribbon longitudinally with the exception at such points where the flexure is to take place. It has also been suggested to reinforce the thin, flexible joint by overlapping curved portions of the reinforcements in such a manner so that the thin, flexible member cannot be subjected to buckling or kinking forces.

The principal object of the invention is the provision of improved means for aligning a check stay.

A further object is the provision of improved means for adjusting check stays to a plane transverse to its longitudinal axis.

These and other objects and advantages will be apparent from the following description, in which reference is had to the accompanying drawing illustrating a preferred embodiment of my invention and wherein similar reference numerals designate similar parts throughout the several views.

In the drawing:—

Figure I is a front elevational view, parts broken away, of a representative type scale embodying my invention.

Figure II is an enlarged side elevational view of my improved check stay adjustment means.

Figure III is a plan view thereof.

Figure IV is an end view of a check riser in connection with which the device of my invention may be employed.

Referring to the drawing in detail, the scale which I have shown is of a type so widely known that a detailed description is not necessary and I will, therefore, refer to it and describe it only in so far as is necessary to adequately disclose my invention.

Within the base 1 a pair of fulcrum bearings 2 fixed in any suitable manner support the fulcrum pivots 3 of a lever 4. This lever is also provided with a pair of load pivots 5 which are in spaced relation to the fulcrum pivots 3. These load pivots 5 support the bearings 6 of a load supporting spider 7 to the upper end of which the load receiver 8 is suitably fastened. A laterally extending arm 9 of the spider 7 curves upwardly into a housing 10 which is secured to the opposite end of the base 1 and to this upward extension a check riser 11 is adjustably fastened. The adjustable fastening means comprise a screw 12 threaded through an aperture in a turned over portion 11' of the check riser 11. The end of this screw contacts the bottom portion of the laterally extending arm 9, and serves to micrometrically adjust the height of the check riser. An elongated slot 13 is provided in the check riser 11 through which two screws 14 project which are threaded into the side of the upwardly curved portion of the laterally extending arm 9 and serve to lock the check riser in adjusted position. The housing 10 also supports and houses the counterbalancing mechanism (not shown) to which the weight and price indicator 15 is secured. This indicator co-operates with an indicia bearing chart 16 which is also suitably located and fastened within the housing 10.

In this embodiment, I have shown my invention in co-operative relation with a check link of an improved flexure plate type. The check stay shown substantially in Figure II comprises a thin strip 17 of highly tempered flexible steel or other material. This thin strip 17 is suitably reinforced and constrained to flex only on predetermined axes by reinforcing plates 18, 19, 20, 21, 22 and 23 and which, for the purpose of preventing sidewise flexing or kinking, are provided with overlapping portions 24, 25, 26 and 27. These reinforcing members are secured to the flexible strip 17 by means of the screws 29 and 30 and the ends of the flexible strip 17 and their reinforcing members are secured to the bent over portion 11² of the check riser 11 and the adjustable fulcrum block 31 by the screws 32 and 33 respectively. In check stays, as has been previously mentioned, it is of prime importance that they are aligned with certain axes of the scale. This adjustment block is for the purpose of adjusting the transverse axis parallelly to the plane formed by the pivots 3 and 5 of the lever 4. When this has been accomplished, the block 31 may be locked in this position by the screw 41. The bent over portion 11² to which one end of the check stay is fastened by means of the screw 32 is also adapted to be adjusted to the plane formed by the fulcrum and load pivots of the lever 4 by slightly bending it as in this embodiment of my invention, the check riser is a rigid steel stamping. Should the check riser be made from different material, for instance, an iron or aluminum casting, it is my intention to fasten this end of the check stay to a block similarly adjustable, as the one to which the other end of the check stay is secured. These adjustments are provided for the purpose of eliminating costly and difficult machining operations and thus achieving economies in manufacture and service. To facilitate a further adjustment, it is secured to an adjustment lug 35 by means of a shoulder screw 34 which extends through an accurately reamed aperture. The adjustment lug 35 in turn is adjustably secured to a boss 36 which projects inwardly from the rear wall of the housing 10 by means of a screw 37. Adjacent to the slanting side of the adjustment lug 35 and parallel to it is an elongated boss 38 also projecting inwardly from the rear wall of the housing 10 through which screws 39 and 40 are threaded. The ends of these screws contact the side of the adjustment lug 35, one on either side of the fulcrum screw 37 and by loosening one and tightening the other, a limited horizontal adjustment of the check stay can be achieved (see Figure 1).

When the scale is being assembled, the lever 4 is blocked so that the edges of the pivots 3 and 5 are in a horizontal plane. The check riser 11 is then fastened to the laterally extending arm 9 of the spider 7 by the screws 14 and locked in this position. The bent over portion 11² is then twisted by means of a pair of pliers or a tool made for this purpose (if necessary), until the top surface is parallel to the plane formed by the pivots 3 and 5. When assembling the check riser 11 to the laterally extending arm, it is purposely fastened in a higher position than is tolerable in operation for the purpose of obtaining a simple and inexpensive micrometric height adjustment. The screws 14 are now loosened just sufficiently so that by turning the screw 12, the check riser 11 will be micrometrically lowered into the correct position. The screws 14 are then tightened and the check stay 17' fastened thereto with the screw 32. The other end of the check stay is then clamped to the adjustable block 31 by the screw 33, there being certain transverse stiffness in the check stay which many times is sufficient to accurately align the check stay by swivelling the block 31 about the axis of the screw 34 so that the plane of the check stay should now be in absolute parallelism with the plane formed by the edges of the pivots in the lever 4, however, a slight twisting with the fingers in any case is sufficient to align these members. The block is then locked to the screw 34 in adjusted position by the screw 41.

When weights are placed on the load receiver 8 equal to nearly the full capacity of the scale, the indicator should now assume equal positions with reference to the chart 16 regardless whether the weights are placed near the outer or inner edge of the load receiver 8. If there is a slight variation, the final adjustment may be made by loosening the screw 39 and tightening the screw 40 or vice versa depending whether the indication is "slow or fast". This adjusts the position of the lug 35 and the thereto secured adjustable block 31.

Although the adjusting means herein disclosed have been shown and described in connection with a check stay of the flexure plate type, it will be readily apparent to anyone versed in the scale art that it is equally adaptable for check links of nearly all types which have tension and compression members and that it may be employed in connection with movable parts of load-supporting structures other than check risers. It is to be understood that the embodiment of my invention herein shown and described is to be regarded as illustrative only, and it is to be understood that the invention is susceptible to variation, modification, and change within the spirit and scope of the subjoined claims.

Having described my invention, I claim:—

1. In a device of the class described, in combination, movable load-supporting means, load-counterbalancing and indicating mechanism operatively connected to said movable load-supporting means, a stationary frame, a part movable with said load-supporting means, a check stay having flexible strips adjacent its ends, and means for fastening the ends of said check stay respectively to said movable part and said stationary frame, said fastening means including a member adapted to swivel about an axis extending in a direction longitudinal of said check stay.

2. In a device of the class described, in combination, movable load-supporting means, load-counterbalancing and indicating mechanism operatively connected to said movable load-supporting means, a stationary frame, a part movable with said load-supporting means, a check stay having flexible strips adjacent its ends, and means for fastening the ends of said check stay respectively to said movable part and said stationary frame, said fastening means including a member adapted to swivel about an axis extending in a direction longitudinal of said check stay, said fastening means also including a member adjustable about an axis extending transversely of said check stay.

SAMUEL N. HURT.